United States Patent [19] [11] 4,447,502
Sommerer [45] May 8, 1984

[54] BOTTLENECK FOIL

[75] Inventor: Klaus Sommerer, Hann. Münden, Fed. Rep. of Germany

[73] Assignee: Haendler & Natermann GmbH, Hann. Münden, Fed. Rep. of Germany

[21] Appl. No.: 410,810

[22] Filed: Aug. 23, 1982

[30] Foreign Application Priority Data

Sep. 19, 1981 [DE] Fed. Rep. of Germany ....... 3137324

[51] Int. Cl.3 ........................ B65D 23/8; B65D 65/38; B32B 15/08

[52] U.S. Cl. ...................................... 428/571; 428/43; 428/128; 428/138; 428/463; 215/1 R; 215/365; 215/DIG. 6

[58] Field of Search ................. 428/606, 571, 43, 138, 428/463; 215/1 R, 365, DIG. 6

[56] References Cited

U.S. PATENT DOCUMENTS 4,326,350 4/1982 Roske .................................... 428/43
4,340,638 7/1982 Brugmans ........................... 428/463

FOREIGN PATENT DOCUMENTS 53-112984 10/1978 Japan .................................. 428/606

*Primary Examiner*—Veronica O'Keefe
*Attorney, Agent, or Firm*—Sprung, Horn, Kramer & Woods

[57] ABSTRACT

The invention relates to a bottleneck foil consisting of an aluminum foil section provided on at least one side with a special protective layer which comprises 1–40 percent by weight of a binder which is not resistant to alkaline solutions and 60–99 percent by weight of a binder which is resistant to alkaline solutions.

11 Claims, No Drawings

BOTTLENECK FOIL

BACKGROUND OF THE INVENTION

1. Field of the Invention

This invention relates to a bottleneck foil consisting of an aluminum foil section which is coated with a protective layer on both sides.

2. Discussion of Prior Art

Such bottleneck foils are known from German Offenlegungsschrifts Nos. 26 40 109, 28 19 510 and 29 21 402. The coating has been provided in order to prevent a dissolving of the aluminum foil sections in the washing solution used for washing the bottles after use. In the previous practice the spent washing solutions had to be subjected to an expensive purification in order to avoid pollution of the environment by aluminum dissolved in the sewage. Additionally, hydrogen was produced as the aluminum dissolved in the washing solution and gave rise to considerable explosion risk in the cleaning plants. Moreover, the recovery of the aluminum of the detached bottleneck foils is of increasing importance.

Bottleneck foils which have coatings that are resistant to alkaline solutions have the disadvantage that they can be detached from the bottles only with greater difficulty. Some proposals to overcome this disadvantage have already been proposed.

Offenlegungsschrift No. 26 40 109 discloses the earliest proposal known to the applicant how that object can be accomplished. For this purpose the bottleneck foils are embossed so that their surface is overstretched and perforates at numerous points. But that measure has not become commercially accepted because as the foils are applied the adhesive seeps to the outside through the perforations and soils the apparatus to such a high degree that it must be cleaned frequently. As a result, the foils cannot be economically applied. Additionally, adhesive which has seeped through the bottleneck foil to the outside is unpleasant to the consumer and for this reason is undesired.

German Offenlegungsschrift No. 28 19 510 proposes to provide a foil which on the side to be bonded to the substrate contains one or more substances which in the presence of water produce or promote a washing action. But it has been found that the measure will be entirely ineffective at least when the adhesive used to apply the foil has become entirely dry. In such cases the washing solution cannot penetrate between the bottole and the foil and in spite of the detergent substances the times required for detaching the foil are so long that the aluminum foil is dissolved to a substantial degree from the cut edge before the bottleneck foil has been entirely detached. For this reason the desired effect of the coating which resists alkaline solutions is produced only in part and the above-mentioned disadvantages of unprotected foils are not avoided.

The latest proposal, disclosed in German Offenlegungsschrift No. 29 21 402, calls for an aluminum foil which is provided on both sides with coatings which are resistant to alkaline solutions and have registering weak areas in the form of stripes or the like. In this way, points in addition to the outer edge of the foil section are provided for an attack for detaching the foil. But for that purpose the aluminum foil must be dissolved adjacent to the weak areas. That measure too has not always produced the desired result because the foil cannot be detached within a satisfactorily short time when the adhesive has become very dry. Additionally, more aluminum is likely to be dissolved owing to the presence of the weak areas.

Another proposal, which has not been published yet, has been made in German Patent Application No. P 31 12 462.3 and calls for providing at least on the adhesive side a layer which is resistant to alkaline solutions and contains a polyamide resin. It has been found that the separation of the bottleneck foils can be substantially facilitated in this manner.

However, the tentative use of such bottleneck foils has revealed another problem. The normal residence time of the bottles in the cleaning plants is about 20 minutes and some thousands of bottles are always contained in the washing solution for three to seven minutes, depending on the size of the plants. Those plants which are arranged for an automatic transportation of the bottles are shut down at the end of each shift as well as for the lunch break and in case of trouble. As a result, in such event some of the bottles to be cleaned necessarily stay much longer in the washing solution than those washed during a continuous cleaning operation when the operation is not shut down.

It has now been found that all protective layers used thus far resist alkaline solutions for an unlimited time but cannot prevent a dissolution of the aluminum foil section if the washing solution can act much longer than for the normal transit or residence time. For this reason the bottleneck foils are not only detached as desired during the above-mentioned down times but the aluminum content is entirely dissolved during those times and in that case the protective layers which are resistant to alkaline solutions for a jellylike composition which remains in the washing solution and the protective layers agglomerate to form relatively large lumps. For this reason the bottleneck foil residues consisting of the material of the protective layers tend to stick to and clog sieves, pipelines and pumps of the system for circulating the washing solutions so that additional down times are required for the cleaning of the cleaning plants. Additional aluminum is dissolved and additional bottleneck foil residues which can be eliminated only with difficulty are formed during such down times so that it is very difficult to maintain the cleaning plants in an operative condition.

It might be assumed that the disadvantages described hereinbefore which are encountered during scheduled down times can be avoided if the reception of bottles is interrupted so soon that there will be no bottles in the washing solution during the down times. In that case, however, working time will be lost when the plant is restarted because the machine must then be refilled with bottles. Additionally, that proposal does not produce satisfactory results because it is not easy to entirely remove from the washing solution the bottle neck foils which have been detached so that a sticking and clogging must still be expected.

The cleaning plants could be provided with means for mechanically removing the residues from the washing solution. However, this would involve considerable difficulties since the conveyors must pass through the washing basin. For such operation a highly complicated mechanism is required. It is virtually impossible to economically provide a plant which operates thusly in a reliable manner.

For this reason, it is an object of the invention to provide another solution to the problems which have been described and to ensure, without need for a substantial additional expenditure, that the residues of the bottleneck foils which become available when the aluminum content has been dissolved after scheduled and unscheduled down times of the cleaning plants will not stick to and clog the means for circulating the detergent solution.

SUMMARY OF THE INVENTION

This object is accomplished by a bottleneck foil comprising an aluminum section coating on both sides with the protective layer, the protective layers comprising 1 to 40% by weight of a binder which is not resistant to alkaline solutions and 60 to 99% by weight of a binder which is resistant to alkaline solutions. By the term "alkaline solutions" there is meant in particular, alkaline cleaning solutions, especially of the type used to clean aluminum foil labeled bottles, such as beverage bottles, expecially for beer and soft drink beverages.

Suitable binders which are not resistant to alkaline solutions include polyvinylacetate, polyamide resins, maleic acid ester resins, cellulose nitrate or mixtures of said substances.

Suitable binders which are resistant to alkaline solutions include polyester resins derived from terephthalic acid and aliphatic diols, vinyl chloride copolymers, polyvinyl butyral resins, acrylic resins, methacrylic resins or mixtures of said substances. Vinyl chloride copolymers preferably comprising vinyl chlorides, vinyl acetate and maleic acid. Particularly preferred acrylic resins are those based on butyl acrylate. Particularly preferred methacrylic resins are those based on ethyl methacrylate and butyl methacrylate.

Preferred mixtures for the protective layers consist of 5 to 20% polyamide resin, 30 to 60% vinyl chloride copolymer and 30 to 60% methacryl resin. A mixture which has proved particularly suitable consists of 10% polyamide resin, 45% vinyl chloride copolymer and 45% methacryl resin. The mixture is suitably applied to each side in a quantity of 0.5 to 5 g/m$^2$.

In a washing solution consisting suitably of 2% sodium hydroxide solution at 85°, protective layers consisting of the mixtures proposed according to the invention disintegrate after a certain residence time into particles which are suspended in the washing solution and are not sticky and do not agglomerate so that they will not clog the circulating system. These particles can be removed from the washing solution with suitable sieves and filters without need for an appreciable additional expenditure. The composition of the mixture can be suitably selected within the stated ranges so that protective layers can be obtained which have controlled residence times that will meet any operational requirement.

If the mixture from which the protective layer is made comprises, for example, a vinyl chloride copolymer which is resistant to alkaline solutions and a polyamide resin which is not resistant to alkaline solutions, the use of a higher proportion of the binder which is resistant to alkaline solutions will result in a longer disintegration time and the use of a higher proportion of the binder which is not resistant to alkaline solution will result in shorter residence times. If the proportion of polyamide resin is increased above 20% the resulting protective layers will not be resistant to alkaline solutions. Such protective layers are not desired because they pollute the sewage and permit dissolution of the aluminum, as has been described hereinbefore. On the other hand, if the proportion of vinyl chloride copolymer exceeds 60% the resulting protective layers will be resistant to alkaline solutions and the disadvantages described hereinbefore will be encountered during down times of the cleaning plant.

It has been found in practice that the problems related to the dissolving of the aluminum cannot be solved unless the problems involved in the down times of the cleaning plants are solved. The former problems cannot be solved in any case in such a manner that the dissolving of aluminum can be entirely avoided. Even during a troublefree and uninterrupted operation of the cleaning plants, a partial dissolving cannot be prevented because the washing solution will attack the aluminum at the edge of the bottleneck foil and at ruptures and pores in the protective layers. For this reason, measures to prevent pollution of the sewage and a risk of explosion cannot be avoided even where protective layers are used which are resistant to alkaline solutions. For this reason, it is tolerable that the use of protective layers comprising the mixture proposed by the invention may involve a dissolution of a somewhat higher proportion of aluminum since a satisfactory operation of cleaning plants in conjunction with recovery of 85 to 95% of the aluminum content of the bottleneck foils is not possible unless the down time problem is solved.

Bottleneck foils provided with the protective layers according to the invention can easily be detached during normal operation, the difficulties involved in down times are overcome and even those bottleneck foils are detached which are not discharged during normal cleaning operations because there are no defined flow conditions in numerous portions of the plant. The measures described here can obviously be combined with the use of mutually opposite weak areas in the protective layers disclosed in U.S. Ser. No. 153,221, now U.S. Pat. No. 4,326,350, whose disclosure is specifically incorporated herein by reference. In this way, all difficulties involved in the application and detaching of bottleneck foils are avoided.

What is claimed is:

1. A bottleneck foil comprising an aluminum foil section coated on both sides with a protective layer, the protective layer comprising a mixture of
 1 to 40% by weight of a binder which is not resistant to alkaline solutions and
 60 to 99% by weight of a binder which is resistant to alkaline solutions.

2. A bottleneck foil according to claim 1, wherein the binder which is not resistant to alkaline solutions is selected from the group consisting of polyvinylacetate, a polyamide resin, a maleic acid resin, cellulose nitrate and a mixture of said substances.

3. A bottleneck foil according to claim 1, wherein the binder which is resistant to alkaline solutions is selected from the group consisting of a polyester resin derived from terephthalic acid and at least one aliphatic diol, a vinyl chloride copolymer, a polyvinyl butyral resin, an acrylic resin, a methacrylic resin and mixtures of said substances.

4. A bottleneck foil according to claim 3, wherein said binder which is resistant to alkaline solutions is a vinylchloride copolymer which is the copolymerization product of vinyl chlorides, vinyl acetate and maleic acid.

5. A bottleneck foil according to claim 3, wherein the binder which is resistant to alkaline solutions is an acrylic resin based on butyl acrylate.

6. A bottleneck foil according to claim 3, wherein the binder which is resistant to alkaline solutions is a methacrylic resin based on ethyl methacrylate or butyl methacrylate.

7. A bottleneck foil according to claim 1, wherein said protective layer comprises:

5 to 20% polyamide resin 30 to 60% vinyl chloride copolymer and 30 to 60% methacrylic resin.

8. A bottleneck foil according to claim 7, wherein said protective layer comprises 10% polyamide resin 45% vinyl chloride copolymer and 45% methacrylic resin.

9. A bottleneck foil according to claim 1, wherein said foil has mutually opposed weakened areas.

10. A labeled bottle comprising a bottle and an aluminum foil label wherein said aluminum foil label is that of claim 1.

11. A labeled bottle according to claim 10, wherein said foil is secured to said bottle by adhesive means.

* * * * *